Oct. 21, 1958     F. D. SOLOMON     2,856,891

FLAG MEMBER FASTENING MEANS

Filed May 21, 1956

Francis D. Solomon,
Inventor.
Koenig and Pope,
Attorneys.

United States Patent Office 2,856,891
Patented Oct. 21, 1958

2,856,891

FLAG MEMBER FASTENING MEANS

Francis D. Solomon, Peoria, Ill.

Application May 21, 1956, Serial No. 586,036

3 Claims. (Cl. 116—173)

This invention relates to fastening means for securement of a member to a rod, and more particularly to such means for securing an ornamental member to the usual radio antenna on an automobile.

Among the several objects of the invention may be noted the provision of a fastening means for securement of a member such as an automobile ornament to a rod such as an automobile antenna, which enables the member to be quickly and easily installed on the rod without requiring the use of any tools; the provision of a fastening means of this class which enables the member readily to be positioned at any desired lengthwise location on the rod and at any desired angle; the provision of a fastening means of this class which enables the member to be quickly removed for replacement by a different member when desired; and the provision of a fastening means of this class which is economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a view in elevation showing an automobile ornament attached to an automobile antenna by fastening means of this invention;

Figure 10:
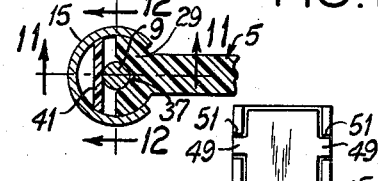
Fig. 10 is a view similar to Fig. 2 showing a further modification.
Figure 11:
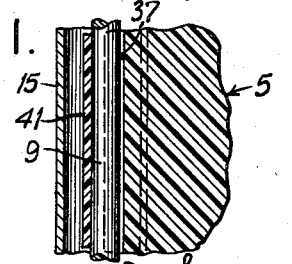
Figure 12:
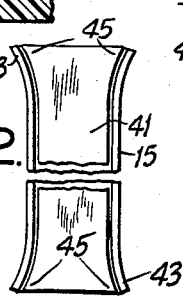
Figure 13:
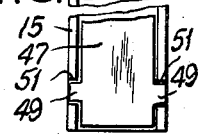

Figs. 11 and 12 are vertical sections taken on lines 11—11 and 12—12 of Fig. 10; and, Fig. 13 is a view similar to Fig. 12 showing a modification of the form of the invention shown in Figs. 10–12.

Corresponding reference characters indicate corresponding parts throughout the several views of the drawings.

Figure 1:
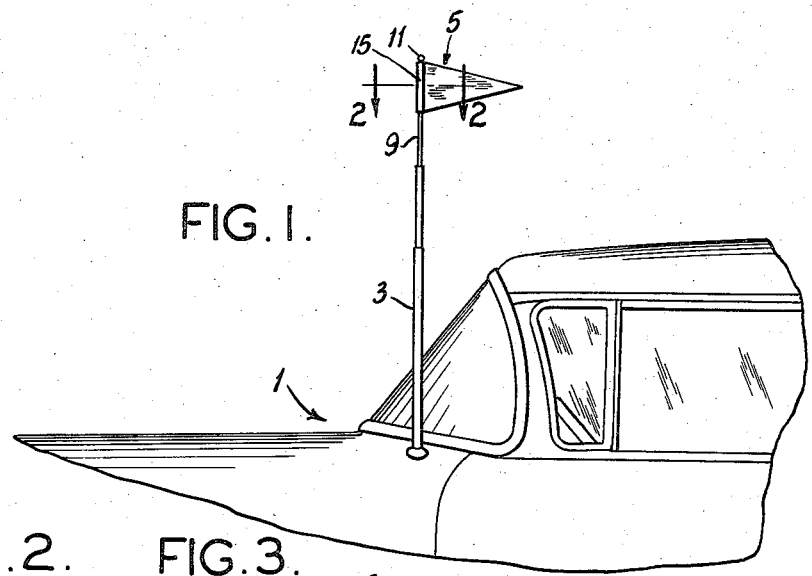

Referring to the drawing, there is indicated at 1 in Fig. 1 an automobile having the usual telescoping type extensible radio antenna 3. At 5 is indicated an ornament member secured to the upper end portion of the antenna. As shown, this ornament member comprises a flat rigid triangular body resembling a pennant. It will be understood that it may be made in different shapes to represent such items as flags, wings, a streak of lightning, various college pennants, etc. It may be made, for example, of suitable plastic material. It may have various surface treatments, may be of different colors, may be monogrammed, etc.

Figure 2:
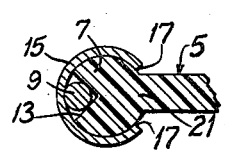
Fig. 2 is an enlarged horizontal cross section taken on line 2—2 of Fig. 1.

The ornament 5 has an enlarged substantially straight edge portion 7 which projects laterally outward from both sides from the ornament member and which is adapted for lengthwise engagement on the outside thereof opposite the ornament member by the rod 9 (the innermost part) of the antenna. This rod 9, as shown in Fig. 1, has a ball 11 at its upper end. As shown in Fig. 2, the edge portion 7 is cylindrical in cross section. Its diameter, as shown, is greater than the thickness of the flat body of ornament 5. It will be understood that the thickness of the body need not be less than the diameter of edge portion 7 except adjacent the edge portion. For example, the ornament, including the edge portion 7, may be generally of the same thickness as the diameter of edge portion 7 with grooves in opposite sides of the body defining the cylindrical edge portion. It is provided with a V-shaped groove 13 extending lengthwise on the side opposite the body for reception of the rod 9. This groove is of less depth than the radius of the cylindrical edge portion 7 and the rod 9 has its outer portion generally tangent with the arc across the groove at the cylindrical surface of the edge portion 7.

At 15 is indicated an elongate spring clip of C-shape in cross section embracing the cylindrical edge portion 7 and adapted for holding the ornament 5 in place on the rod 9. This clip may be made, for example, of sheet metal. The internal diameter of the clip corresponds generally to the diameter of the cylindrical edge portion 7. The longitudinal edges 17 of the clip define a lengthwise slot 21 which, in the unstressed condition of the clip, is narrower than the cylindrical edge portion 7 and wider than the thickness of the body of the ornament 5 adjacent edge portion 7.

Figure 3:
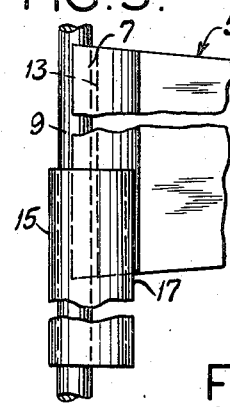
Fig. 3 is a view in elevation illustrating a mode of applying the ornament to the antenna.

Fig. 3 shows how the ornament 5 is secured to the rod 9. The latter is extended from its containing part a distance greater than twice the length of edge portion 7 of the ornament. The ornament is applied to the rod 9, the latter being received in the groove 13. Then the clip 15 is applied to the edge portion 7 to embrace the latter and to surround the rod by sliding the clip longitudinally on the edge portion 7. The clip frictionally holds the ornament on the rod at any desired location on the rod, and the ornament may be rotated on the rod to any desired angular position. To remove the ornament, all that needs to be done is to slide the clip off edge poriton 7. An alternative mode of applying the clip is to snap it on over the edge portion 7.

The groove 13 may be dimensioned so that the ornament is loose on the rod instead of being frictionally held on the rod. In this case, the ornament slides down on the rod 9 and bears against the upper end of the sleeve portion of the antenna in which rod 9 is slidable. In the case where the ball 11 is larger than the clip, the ball prevents the ornament from sliding upward off rod 9.

Figures 4, 5:
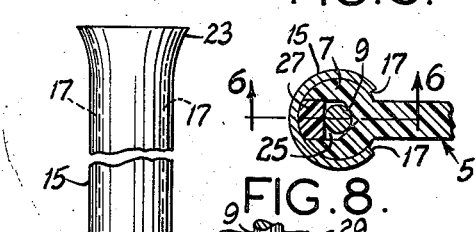
Fig. 4 is a view in elevation showing a modification of a clip of the fastening means.
Fig. 5 is a view similar to Fig. 2 showing a modified fastening means.

Fig. 4 shows a modification of the clip 15 in which one end is flared as indicated at 23 to facilitate endwise sliding of the clip on to the edge portion 7.

Figure 6:
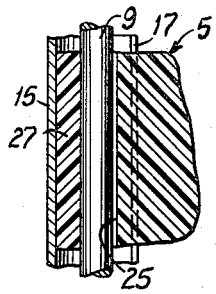
Fig. 6 is a vertical section taken on line 6—6 of Fig. 5.

Figs. 5 and 6 illustrate a modification in which the groove in edge portion 7 is of greater depth than the radius of edge portion 7 by approximately half the radius of rod 9. In Figs. 5 and 6 the groove is designated 25, and is shown to have parallel sides and a V-bottom. A filler piece 27 is provided in the groove for gripping against the rod 9. Filler piece 27 has a depth corresponding to the depth of groove 25 less the diameter of rod 9. In this modification, the axis of the rod 9 and the axis of edge portion 7 are substantially coincident. Filler piece 27 may be secured to the clip, as by adhesive.

Figure 7:
Fig. 7 is a view similar to Fig. 2 showing another modification.
Figure 8:
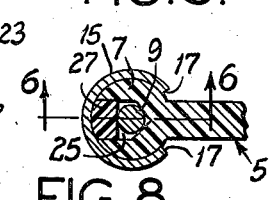
Fig. 8 is a vertical cross section taken on line 8—8 of Fig. 7.

Figs. 7 and 8 illustrate a modification in which the edge portion of the ornament is made of semi-cylindrical shape in cross section. In Figs. 7 and 8, the edge portion is designated 29. It is provided with a semi-circular groove 31 in its flat side for reception of rod 9. Extending lengthwise within the clip 15 substantially the full length of the clip on the outside of edge portion 29 is a filler piece 33 of semi-cylindrical cross section corresponding to the cross section of edge portion 29, and having a groove 35 in its flat side registering with groove 31 for receiving the rod 9. Filler piece 33 may be secured to the clip, as by adhesive.

Figure 9:
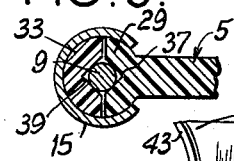
Fig. 9 is a view similar to Fig. 7 showing a modification of the Fig. 7 form of the invention.

Fig. 9 shows a variation of the fastening means shown in Figs. 7 and 8 in which the rod-receiving grooves, instead of being semi-circular, are V-shaped, as indicated at 37 and 39. Otherwise, the Fig. 9 modification is the same as the modification shown in Figs. 7 and 8.

Figs. 10 and 11 illustrate a modification similar to that of Figs. 7 and 8 except that instead of using a semi-cylindrical filler piece, a flat strip 41 is used extending lengthwise within the clip 15 and engaging the rod 9. This strip 41 may be soldered to the clip, or, as shown in Fig. 12, the clip 15 may be flared at both ends, as indicated at 43 in Fig. 12, and the strip 41 has flared projections 45 at its ends engaging the flares 43 to hold it in assembly with the clip.

Fig. 13 illustrates a variation of the modification shown in Fig. 12 in which the strip, designated 47, has projections 49 received in slots 51 in the clip 15 to hold it in assembly with the clip. The latter need not have its ends flared in this case.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In combination, a rigid flat member having an enlarged substantially straight edge portion which projects laterally outward from both sides of said flat member and which is adapted for lengthwise engagement on the outside thereof opposite said flat member by a rod, and an elongate spring clip of C-shape in cross section embracing said edge portion and adapted for holding said member in place on the rod, the longitudinal edges of said C-shaped clip defining a slot which, in the unstressed condition of the clip, is narrower than said edge portion of said member.

2. In combination, a rigid flat member having an enlarged substantially straight edge portion which projects laterally outward from both sides of said flat member and which is adapted for lengthwise engagement on the outside thereof opposite said flat member by a rod, an elongate spring clip of C-shape in cross section embracing said edge portion and adapted for holding said member in place on the rod, the longitudinal edges of said C-shaped clip defining a slot which, in the unstressed condition of the clip, is narrower than said edge portion of said member, and a filler piece extending lengthwise within the clip substantially the full length of the clip.

3. In combination, an automobile ornament comprising a rigid flat member having a substantially straight cylindrical edge portion, the diameter of said cylindrical edge portion being greater than the thickness of said flat member adjacent said edge portion, said edge portion projecting laterally outward from both sides of said flat member and being provided with a groove extending lengthwise on the outside thereof opposite the flat member and coplanar with the flat member for reception of an antenna rod, and an elongate spring clip of C-shape in cross section embracing said cylindrical edge portion and adapted for holding said flat member in place on the rod, the longitudinal edges of said C-shaped clip, in the unstressed condition of the clip, being spaced a distance less than the diameter of said cylindrical edge portion of said flat member and greater than the thickness of said flat member adjacent said edge portion.

References Cited in the file of this patent

UNITED STATES PATENTS

| | | |
|---|---|---|
| 1,535,396 | Buehler | Apr. 28, 1925 |
| 2,290,645 | Lange | July 21, 1942 |
| 2,625,426 | Weymouth | Jan. 13, 1953 |
| 2,665,103 | Flora et al. | Jan. 5, 1954 |